United States Patent [19]

Washbourn et al.

[11] 4,264,110

[45] Apr. 28, 1981

[54] TRAIN BRAKING APPARATUS

[75] Inventors: Jack Washbourn; David J. Wickham, both of London, England

[73] Assignee: Westinghouse Brake and Signal Co. Ltd., London, England

[21] Appl. No.: 942,681

[22] Filed: Sep. 15, 1978

[30] Foreign Application Priority Data

Sep. 20, 1977 [GB] United Kingdom ............... 39041/77

[51] Int. Cl.³ .............................................. B60T 13/68
[52] U.S. Cl. ....................................... 303/17; 303/15; 303/16
[58] Field of Search ..................... 303/3, 15, 16, 17, 36, 303/37, 38, 20, 26, 47, 69

[56] References Cited

U.S. PATENT DOCUMENTS

| | | | |
|---|---|---|---|
| 363,464 | 5/1887 | Hollerith | 303/16 |
| 1,131,218 | 3/1915 | Dewson | 303/17 |
| 1,136,062 | 4/1915 | Turner | 303/17 |
| 1,967,308 | 7/1934 | Hewitt | 303/15 |
| 3,707,314 | 12/1972 | Paginton | 303/36 |
| 4,025,125 | 5/1977 | Wickham | 303/81 |

*Primary Examiner*—Reinhard J. Eisenzopf
*Attorney, Agent, or Firm*—Larson, Taylor and Hinds

[57] ABSTRACT

The invention concerns an electrically assisted pneumatic train braking system. In a normal emergency/service pneumatic braking system a pneumatic pressure change must propagate along the train braking system from car to car. The present system includes two valves which are connected to each end of the brake pipe of each car, the first is responsive to a pressure change in the brake pipe to produce an electrical signal and the second being responsive to the electrical signal to produce a pressure change in the brake pipe. Thus, the propagation time for the whole braking system is reduced to little more than that for the total length of the couplings between cars.

6 Claims, 1 Drawing Figure

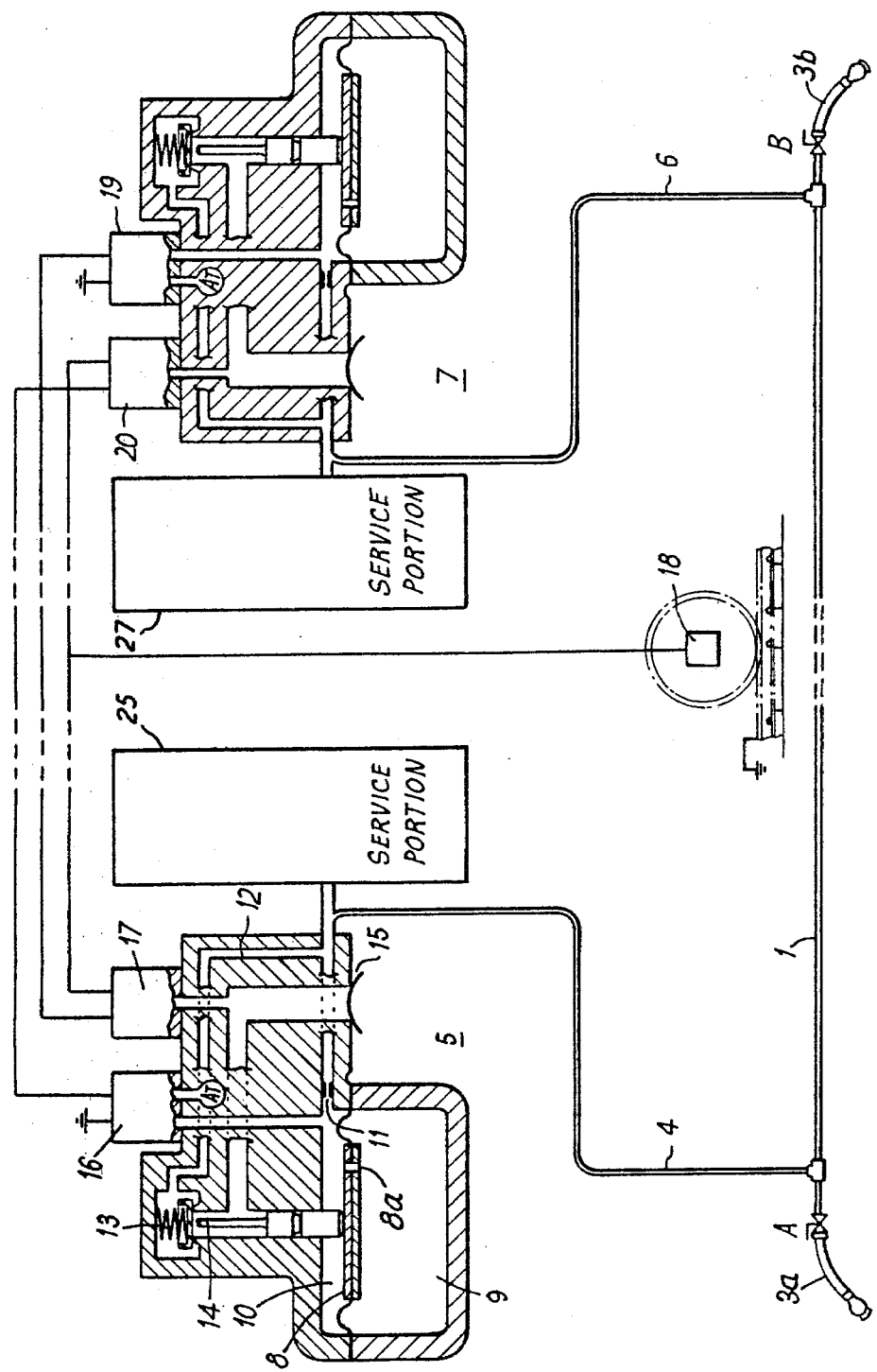

TRAIN BRAKING APPARATUS

This invention relates to train braking apparatus and relates especially to railway train braking systems which operate by controlling the fluid pressure in a brake pipe which extends from one vehicle to the next along a train.

The Specification of U.S. Pat. No. 4,025,125 describes an emergency portion of a brake control valve designed to effect emergency braking when used in conjunction with a direct release triple valve such as described for example in the Specification of U.S. Pat. No. 3,707,314.

Direct release triple valves operate by effective brake applications on long trains by responding to reductions of brake pipe pressure in relation to a charged auxiliary reservoir. Such reductions cause the connection of the auxiliary reservoir to the brake cylinders to apply the brakes up to a point where the reduced auxiliary reservoir is again balanced by the reduced brake pipe pressure.

The emergency portion is designed to respond to greater than predetermined service rates of brake pipe reduction to effect venting of the brake pipe and connection of an emergency reservoir to the brake pipe. It will be appreciated however that the rate of propagation of service or emergency braking along a long train is dependent upon the rate at which it is possible to transmit reduction of brake pipe pressure along the full length of the train.

According to the present invention there is provided braking apparatus for a rail vehicle to be used as part of a train of vehicles, including a brake pipe section extending between the ends of the vehicle the pressure in which is variable for controlling brakes of the vehicle, said section having connected thereto at a point adjacent one end thereof a fluid pressure change-responsive device operable to transmit electric signals corresponding to a change and having connected at a further point adjacent the other end thereof a signal-responsive valve responsive to electric signals transmitted by the change-responsive device, the signal-responsive device being operable in response to received electric signals to initiate a corresponding change of pressure at the further point.

The invention may be especially beneficial when applied to emergency braking in a train braking system wherein brake applications are effected by reductions of brake pipe pressure and in such an application of the invention the fluid pressure change-responsive device may be arranged to be responsive to release of brake fluid by a vent valve which operates only in response to a brake pipe pressure change intended to give rise to an emergency brake application.

By virtue of the transmission of electromagnetic signals between points adjacent the ends of the brake pipe section, the propagation of a signal giving rise to an emergency brake application may be improved as compared with the rate of propagation obtainable for emergency brake application signals over the brake pipe along.

In order that the invention may be more clearly understood and readily carried into effect, the same will be further described by way of example with reference to the accompanying drawing, the single FIGURE of which illustrates in schematic form emergency valve apparatus connected at each end of a railway vehicle brake pipe section.

Referring to the drawing, a section of brake pipe is denoted by reference 1 and this section of brake pipe extends between ends A and B of a rail vehicle of a train of vehicles, the sections of brake pipe on adjacent vehicles being connectable thereto via couplers 3a and 3b. Adjacent the end A of the brake pipe section 1 there is connected via a pipe 4, an emergency valve denoted by reference 5 and, connected via a pipe 6 adjacent the end B of the brake pipe section 1 there is connected an emergency valve 7.

In order to simplify the description, the emergency valve 5 is shown in a much simplified form, but it will be understood that in practice it will consist of an emergency valve such as described in the aforesaid first mentioned United States Patent Specification. By way of illustration therefore the emergency portion comprises a pressure-responsive diaphragm 8 providing a dividing wall having an equalizing choke 8a between a quick action chamber 9 and a control chamber 10 (quick action chamber) to which the pipe 4 is connected via a choke 11. The connection to the brake pipe via 4 is also connected via a passage 12 to one side of a normally closed valve member 13 controllable by a rod 14 actuable by, but sealed from, the pressure-responsive member 8. The underside of the valve member 13 is connected to atmosphere via a one-way outlet at 15, such that, when the valve 13 is unseated, brake pipe air is vented to atmosphere via 15. In practice, the emergency reservoir will also be connected to the brake cylinder as a result of this action. Connected to the chamber 10 there is an electrically operable vent valve mounted on the emergency valve and denoted by reference 16.

Upstream of the outlet 15 of the valve 13, there is connected a pressure switch 17 which, when operated, provides a through path for current to a vent valve 19 operable at the other end of the brake pipe section, from an electrical generator 18 linked to one of the axles of the vehicle which thereby provides a local supply.

The emergency valve 7 is substantially identical to the emergency valve 5 and it will be seen from the drawing that the circuit from the electrical generator 18 via the pressure switch 17 to an electrically operable valve 19 identical to valve 16. Likewise, a pressure switch 20 is provided which provides for control of a circuit path between the generator 18 and the electrically operable valve 16.

As represented by blocks in the drawing, the connection by the pipe 4 to the emergency valve 5 also provides a connection to service portions 25 and 27 associated with the emergency valves 5 and 7 and these service portions may comprise suitable triple valves and associated reservoirs such as described for example in U.S. Pat. No. 3,707,314. Such a triple valve provides for normal graduable service braking with direct release and it will be appreciated the emergency valve is so designed that emergency braking is only initiated when a prescribed rate of collapse of brake pipe pressure is effected. For lower rates of fall of brake pipe pressure, the quick action chamber pressure follows the brake pipe pressure.

Referring to the operation of the apparatus, assuming that a driver's brake valve is connected via a section of the train which precedes the point A, that is, a section of the train to the left of the section AB, and that the system is one wherein in a normal fully charged condition, the brake pipe is maintained at a steady pressure in response to which the service portion at each point along the train, such as points A and B, maintain the respective brakes in the released condition. In the event of a reduction of brake pipe pressure communicated via the coupler 3a to the point A indicative of an emergency application being required, such a reduction of pressure causes a rapid fall of fluid pressure in the chamber 10 above the pressure-responsive member 8 which cannot be replenished sufficiently quickly via the small aperture 8a in the diaphragm 8 and the diaphragm 8 is therefore deflected upwards and via the rod 14 unseats the valve 13 to provide venting via the passage 12 and the valve 13 of the brake pipe connection at 4. The loss of air via the valve 13 creates a temporary increase of pressure upstream of the outlet 15 and therefore momentarily operates the pressure switch 17 to provide an electrical circuit for current from the axle generator 18 to the electrically operable valve 19 of the emergency valve 7 connected at the other end of the vehicle. Regardless, therefore, of the delay in propagation which may occur along the brake pipe 1 for such a signal as to give rise to an emergency application by virtue of collapse of pressure at the pipe 6, the valve 19 is operated to produce a momentary collapse of pressure above the pressure-responsive member of the valve 7 which therefore is operated to vent the brake pipe at the point B via the pipe 6. This venting effect immediately manifests itself in the coupler 3b and is therefore transmitted to the following section of brake pipe on the next vehicle of the train.

By virtue of the emergency valve 5 also being provided with an electrically operable valve 16 and the emergency valve 7 also being provided with a pressure switch 20, it will be appreciated that the apparatus shown in the drawing associated with one vehicle of a train is operable in either direction. That is, a reduction of brake pipe pressure communicated via the coupler 3b and which is such as to give rise to an emergency application, will be propagated from the point B to the point A by virtue of the electrical interconnection between the emergency valves 5 and 7 as described above.

Whilst in the foregoing the invention has been described more especially in connection with the improvement of propagation of an emergency brake application, the invention is not limited to this. Thus the invention may be applied alternatively or additionally to quick service valves which are provided to improve the propagation and characteristics of service braking applications.

In the latter case, a quick service device associated with a service valve portion of a brake control valve connected to the brake pipe at one end (say A) of a vehicle may be provided with a pressure-responsive device which is electromagnetically linked to an electromagnetically operable valve to produce local pressure changes at the other end (say B) of the vehicle in order to accelerate the response of the service portion at B to changes of brake pipe pressure being propagated in the direction A to B. As in the case of the emergency valves of the drawing, the arrangement can also be made bidirectional and an electrical supply may be derived in the same manner.

Forms of continuous quick service apparatus are described in U.S. patent application Ser. No. 965,789. In this Specification, changes of brake pipe pressure give rise to a pulsating discharge of air from the brake pipe. By arranging that the pulsating device operates a microswitch or similar means for providing an electromagnetic signal, means may be operated at another control valve to pilot brake pipe air to drive a pulsating device to effect sympathetic quick service operation in the latter.

Having thus described our invention what we claim is:

1. Braking apparatus for a rail vehicle to be used as part of a train of vehicles, including a brake pipe section extending between the ends of the vehicle the pressure in which is variable for controlling brakes of the vehicle, said section having connected thereto at a point adjacent one end thereof a fluid pressure change-responsive device operable to transmit electric signals corresponding to a said change and having connected at a further point adjacent the other end thereof a signal-responsive valve responsive to electric signals transmitted by the change-responsive device, said apparatus further comprising an electrical circuit by which said electrical signals are transmitted, said electrical circuit being discrete to an individual said rail vehicle of the train of vehicles and unconnected electrically to the other vehicles of the train of vehicles when the train of vehicles is formed, the signal-responsive device being operable in response to received electric signals to initiate a corresponding change of pressure at the further point.

2. Braking apparatus as claimed in claim 1, further having connected at a point adjacent the other end a fluid pressure change-responsive device operable to transmit signals corresponding to a change and having connected at a point adjacent the one end a further signal-responsive valve operable in response to signals received from the further change-responsive device to initiate a change at the one end.

3. Emergency braking apparatus for a rail vehicle to be used as part of a train of vehicles, including a brake pipe section extending between the ends of the vehicle, a first emergency brake valve device connected to said brake pipe section at a point adjacent one end thereof and a second emergency brake valve connected to the brake pipe section at a point adjacent the other end thereof, said emergency brake valve devices each having a vent valve being operable in response to a predetermined rate of drop of brake pipe pressure to effect venting of the brake pipe and produce emergency braking conditions, said first emergency brake valve device including fluid pressure change-responsive means responsive to operation of the first emergency valve device to produce an electrical signal, said second emergency valve device having an electrically operable valve device and electrical circuit means discrete to the said vehicle of the train of vehicles and unconnected electrically to the other vehicles of the train of vehicles when the train of vehicles is formed for coupling the electrically operable valve to said change-responsive means so as to be responsive to a said electrical signal, and said electrically operable valve device being connected to cause the second emergency valve device to vent the brake pipe.

4. Braking apparatus as claimed in claim 3, said second emergency brake valve device including a fluid pressure change-responsive means responsive to operation of the second emergency valve device to produce a respective electrical signal, said first emergency valve device having a respective electrically operable valve and further electrical circuit means discrete to said vehicle for coupling the latter electrically operable valve device so as to be responsive to a said respective electrical signal and said respective electrically operable valve device being connected to cause the first emergency valve device to vent the brake pipe.

5. Braking apparatus as claimed in claim 3, the said fluid pressure change-responsive means being connected to a point downstream of the vent valve of the respective emergency valve.

6. Braking apparatus as claimed in claim 3, the said electrically operable valve device being a vent valve operable to vent one side of a pressure-responsive member of the respective emergency valve at the side of a restriction remote from a connection thereto of the brake pipe.

* * * * *